United States Patent
Mizutani et al.

(10) Patent No.: US 7,025,898 B2
(45) Date of Patent: Apr. 11, 2006

(54) HEATING MEDIUM COMPOSITION, AND METHOD FOR FEEDING AN OXIDATION INHIBITOR TO A HEAT EXCHANGE APPARATUS

(75) Inventors: Masumi Mizutani, Gifu (JP); Akihiro Sagasaki, Gifu (JP); Koichi Hamada, Osaka (JP); Yuji Higuchi, Osaka (JP); Kazuhisa Ikawa, Osaka (JP)

(73) Assignees: Showa Water Industries Co., Ltd., Gifu-Ken (JP); Osaka Gas Co., Ltd., Osaka (JP)

( * ) Notice: Subject to any disclaimer, the term of this patent is extended or adjusted under 35 U.S.C. 154(b) by 217 days.

(21) Appl. No.: 10/209,227

(22) Filed: Jul. 30, 2002

(65) Prior Publication Data

US 2003/0127624 A1 Jul. 10, 2003

(30) Foreign Application Priority Data

Aug. 8, 2001 (JP) .............................. 2001-240628
Nov. 5, 2001 (JP) .............................. 2001-339658

(51) Int. Cl.
*C09K 5/00* (2006.01)
(52) U.S. Cl. ............................. 252/70; 252/71; 252/76; 252/79
(58) Field of Classification Search ................. 252/70, 252/71, 76, 79
See application file for complete search history.

(56) References Cited

U.S. PATENT DOCUMENTS

| | | | | |
|---|---|---|---|---|
| 4,954,279 A | * | 9/1990 | Ma et al. ........................ | 252/70 |
| 5,298,178 A | * | 3/1994 | O'Neil et al. ................. | 508/281 |
| 5,389,276 A | * | 2/1995 | Coffey et al. .................. | 252/70 |
| 5,718,834 A | | 2/1998 | Pollmann et al. | |
| 5,968,407 A | * | 10/1999 | Boluk et al. ................... | 252/70 |
| 5,997,763 A | * | 12/1999 | Pabon et al. ................... | 252/79 |
| 6,228,283 B1 | * | 5/2001 | Turcotte et al. ............... | 252/76 |
| 6,448,208 B1 | * | 9/2002 | Dubs et al. .................. | 508/229 |

FOREIGN PATENT DOCUMENTS

| | | |
|---|---|---|
| JP | 57026175 | 2/1982 |
| JP | 57-039177 | 3/1982 |
| JP | 58091174 | 5/1983 |
| JP | 58133382 | 8/1983 |
| JP | 61021782 | 1/1986 |
| JP | 62270785 | 11/1987 |
| JP | 8211585 | 8/1996 |
| JP | 9194817 | 7/1997 |
| JP | 11140435 | 5/1999 |
| JP | 11201689 | 7/1999 |
| JP | 2000095886 | 4/2000 |

(Continued)

OTHER PUBLICATIONS

Korean Office Action dated Nov. 8, 2004 for Korean Appl. No. 2004/11/9.

(Continued)

*Primary Examiner*—Necholus Ogden
(74) *Attorney, Agent, or Firm*—Sheridan Ross P.C.

(57) ABSTRACT

A heating medium composition for suppressing deterioration of both a metal piping and a synthetic resin piping. The heating medium composition contains an antifreeze ingredient, water, a corrosion inhibitor, and a surfactant. The corrosion inhibitor includes a triazole compound, and the surfactant includes an anionic surfactant. A bag in a feeder provided in a given position along a circulation piping is filled with an oxidation inhibitor. By flowing a heating medium composition through the feeder, the oxidation inhibitor is gradually dissolved in the heating medium composition.

7 Claims, 1 Drawing Sheet

FOREIGN PATENT DOCUMENTS

| | | |
|---|---|---|
| JP | 2000107649 | 4/2000 |
| JP | 2000178546 | 6/2000 |
| KR | 1998-66099 | 1/1997 |
| KR | 1997-21256 | 4/2000 |

OTHER PUBLICATIONS

Japanese Office Action dated Nov. 30, 2004 for Japanese Appl. No. 2001-339658.

* cited by examiner

US 7,025,898 B2

HEATING MEDIUM COMPOSITION, AND METHOD FOR FEEDING AN OXIDATION INHIBITOR TO A HEAT EXCHANGE APPARATUS

BACKGROUND OF THE INVENTION

The present invention relates to a heating medium composition for use in a heat exchange circuit in, for example, a floor heating system utilizing hot water circulation, a fan convector, an air conditioner, a road heating system, or a snow melting system, and to a method for feeding an oxidation inhibitor to a heat exchange apparatus using the heating medium composition.

Generally, a heat exchange circuit includes a cooling or heating circuit having metal pipings made of various metals, such as iron, copper, and aluminum. As a heating medium composition circulated in the heat exchange circuit, for example, a coolant composition is known consisting of water, a glycol as an antifreeze ingredient, and a corrosion inhibitor for preventing the above metals from suffering corrosion. When the conventional coolant composition is used in a heat exchange circuit, the corrosion inhibitor suppresses corrosion of the metal piping, making it possible to use the heat exchange circuit for a long term.

However, when the conventional coolant composition is circulated in a heat exchange circuit having a piping made of a synthetic resin, such as crosslinked polyethylene, the synthetic resin piping is rapidly deteriorated due to the action of the corrosion inhibitor. For this reason, the conventional coolant composition is unsuitable for the heat exchange circuit having a piping made of a synthetic resin, such as crosslinked polyethylene.

SUMMARY OF THE INVENTION

An object of the present invention is to provide a heating medium composition for suppressing deterioration of both a metal piping and a synthetic resin piping, and a method for feeding an oxidation inhibitor to a circuit in which the heating medium composition is circulated.

According to a first aspect of the present invention, there is provided a heating medium composition containing, as a main ingredient, water or a mixture of water and an antifreeze ingredient; a corrosion inhibitor for preventing a metal material from suffering deterioration; and a surfactant for preventing a synthetic resin material from suffering deterioration.

According to a second aspect of the present invention, there is provided a method for feeding to a heating medium composition an oxidation inhibitor for preventing a synthetic resin from being oxidized. The heating medium composition contains a surfactant and is used in a heat exchange circulation circuit including a heat exchanger, a radiator, and a piping. The method includes connecting a feeding apparatus containing therein the oxidation inhibitor to the piping so that the heating medium composition flowing through the piping passes through the inside of the feeding apparatus; and circulating the heating medium composition within the heat exchange circulation circuit.

According to a third aspect of the present invention, there is provided an apparatus for feeding to a heating medium composition an oxidation inhibitor for preventing a synthetic resin from being oxidized. The heating medium composition contains a surfactant and is used in a heat exchange circulation circuit including a heat exchanger, a radiator, and a piping. The apparatus includes a connection tube connected to the piping; and a container portion, provided in a given position along the connection tube, for containing therein the oxidation inhibitor and for permitting the heating medium composition to pass through the inside of the container portion.

According to a forth aspect of the present invention, there is provided a heat exchange apparatus. The apparatus includes a circulation circuit having a plurality of pipings including a metal piping and a synthetic resin piping, and a heat exchanger connected to at least one piping of the plurality of pipings, and a heating medium composition charged into the circulation circuit. The heating medium composition contains water, a corrosion inhibitor, and a surfactant.

According to a fifth aspect of the present invention, there is provided a method for using a heating medium composition for preventing a circulation circuit from suffering deterioration, the circulation circuit having a metal piping and a synthetic resin piping. The method includes charging into the circulation circuit a heating medium composition in a liquid state containing 25 to 60% by volume of propylene glycol, 0.01 to 0.2% by weight of a triazole compound, 0.001 to 0.1% by weight of a surfactant, and the balance of water; placing in a given position along the circulation circuit an oxidation inhibitor in a solid form for preventing a synthetic resin from being oxidized; and circulating the heating medium composition within the circulation circuit so that the heating medium composition circulated is continuously brought into contact with the oxidation inhibitor in a solid form.

DETAILED DESCRIPTION OF PREFERRED EMBODIMENTS

Figure 1:
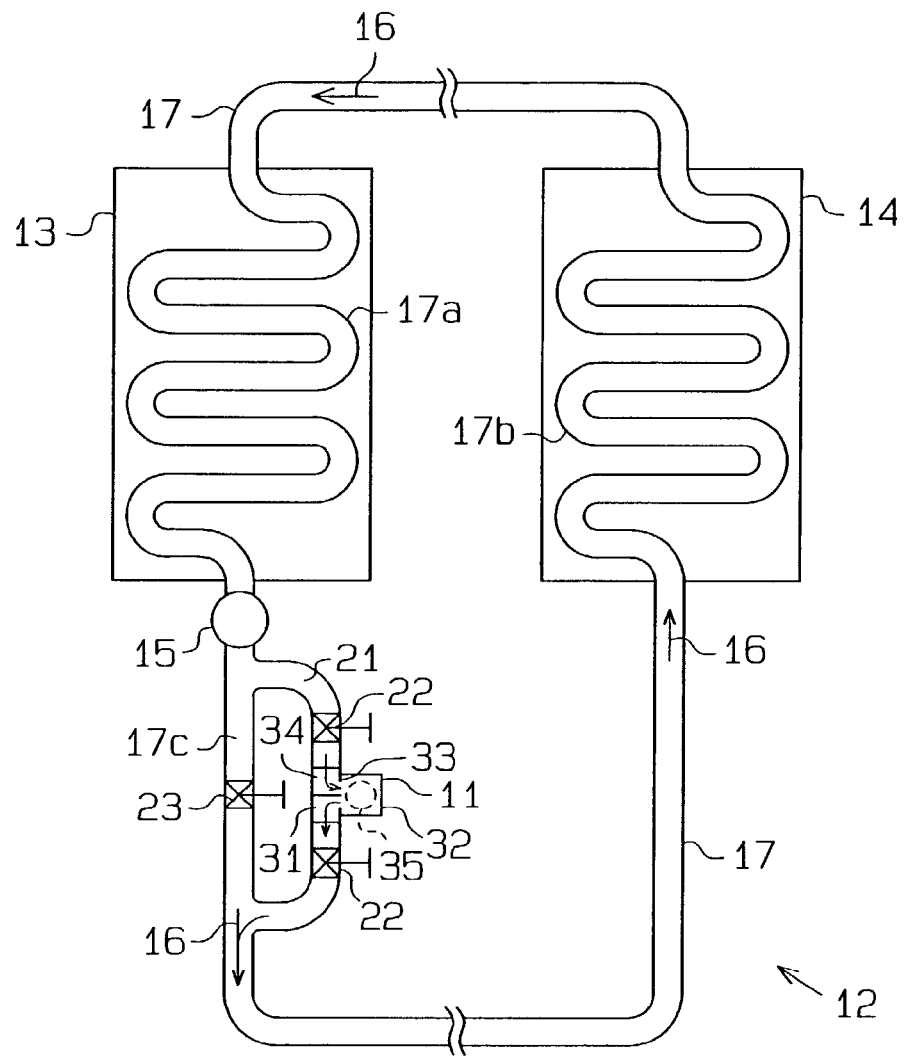
FIG. 1 is a circuit diagram of a heat exchange apparatus in which a heating medium composition according to one embodiment of the present invention is circulated.

A heating medium composition according to one embodiment of the present invention comprises a glycol and water as main ingredients. Further, the heating medium composition contains a corrosion inhibitor and a surfactant. The heating medium composition, as it is or diluted with water, is charged into a heat exchange circuit in a floor heating system, a fan convector, an air conditioner, a road heating system, or a snow melting system. Generally, a heat exchange circuit includes a cooling circuit or a heating circuit, each having a heat exchanger, a plurality of metal pipings, a plurality of synthetic resin pipings, and a plurality of connection portions for connecting these pipings to one another. Examples of materials for the heat exchanger, metal pipings, and connection portions include metal materials, such as cast iron, steel, copper, brass, aluminum, aluminum alloys, and solder. Examples of materials for the synthetic resin pipings include thermoplastic resins, such as crosslinked polyethylene, polyethylene, polypropylene, nylon, polybutene, and polyvinyl chloride; and thermosetting resins, such as polyamide resins and ABS resins. The heating medium composition has an effect of suppressing deterioration of the heat exchanger, metal pipings, synthetic resin pipings, and connection portions.

A glycol is an antifreeze ingredient for lowering the freezing point of the heating medium composition (also having an effect of elevating the boiling point), and further, it has an effect of facilitating dissolution of the corrosion inhibitor in the heating medium composition. Examples of glycols include ethylene glycol, propylene glycol, 1,3-butylene glycol, hexylene glycol, diethylene glycol, and glycerol. From the viewpoint of availability and cost, ethylene glycol and propylene glycol are preferred. The concentration of the glycol in the heating medium composition is appropriately determined depending on, for example, the temperature at which the heating medium composition is used, but the glycol concentration is preferably in the range of from 25 to 60% by volume.

The heating medium composition contains a corrosion inhibitor for preventing the heat exchanger, metal pipings, and connection portions from suffering corrosion. The corrosion inhibitor comprises a corrosion inhibitor which effectively prevents a metal material from suffering corrosion (e.g., a benzoate, a thiazole compound, or an organic acid). The metal materials used in a cooling circuit and a heating circuit generally contain copper, and therefore, a triazole compound which effectively prevents copper from suffering corrosion is preferred. Preferred triazole compounds are benzotriazole and tolyltriazole.

The concentration of the triazole compound in the heating medium composition is preferably 0.01 to 0.2% by weight, more preferably 0.03 to 0.1% by weight. When the triazole compound concentration is less than 0.01% by weight, corrosion of the metal material is not satisfactorily prevented. When the triazole compound concentration exceeds 0.2% by weight, there is a possibility that the triazole compound is deposited in the heating medium composition.

The heating medium composition contains a surfactant for suppressing deterioration of a synthetic resin, especially a thermoplastic resin. The surfactant most efficiently suppresses especially deterioration of crosslinked polyethylene among thermoplastic resins. The surfactant forms a thin coating over the inner wall of the synthetic resin piping. The surfactant coating inhibits the metal ions or metal chelate compounds contained in the heating medium composition from being in contact with the synthetic resin piping. Accordingly, deterioration of the synthetic resin piping due to the metal ions or metal chelate compounds is suppressed.

Examples of surfactants include anionic surfactants, cationic surfactants and nonionic surfactants. Examples of usable anionic surfactants include fatty acid soaps having 10 to 18 carbon atoms, such as laurates, myristates, palmitates, stearates, and oleates, alkylbenzenesulfonates, alkylnaphthalenesulfonates, alkyletherphosphates, alkylphosphates, and 4-(n-butyl)cyclohexylcarboxylates. Examples of usable cationic surfactants include quaternary ammonium salts, such as benzyltri-n-butylammonium chloride and benzyldimethylstearylammonium chloride, and pyridinium salts, such as hexadecylpyridinium chloride. Examples of usable nonionic surfactants include nonionic surfactants including polyoxyethylene glycols and polyhydric alcohols, such as hexamethylene glycol dodecyl ether, polyoxyethylene octyl phenyl ether, sucrose monolaurate, and sorbitan monolaurate.

Anionic surfactants are most preferred since they have a higher effect of suppressing deterioration of the synthetic resin piping than the effects obtained by the cationic surfactants and nonionic surfactants. The concentration of the surfactant in the heating medium composition is preferably 0.001 to 0.1% by weight, more preferably 0.005 to 0.05% by weight. When the surfactant concentration is less than 0.001% by weight, deterioration of the synthetic resin piping is not satisfactorily suppressed. When the surfactant concentration exceeds 0.1% by weight, the heating medium composition is disadvantageously liable to be markedly foamed.

It is preferred that the heating medium composition contain an oxidation inhibitor for suppressing oxidation of a synthetic resin. Preferred examples of oxidation inhibitors include hindered phenol heat stabilizers, such as pentaerythrityl tetrakis[3-(3,5-di-t-butyl-4-hydroxyphenyl)propionate] and octadecyl 3-(3,5-di-t-butyl-4-hydroxphenyl)propionate; 1,3,5-trimethyl-2,4,6-tris(3,5-di-t-butyl-4-hydroxbenzyl) benzene; hindered amine heat stabilizers, such as tris(3,5-di-t-butyl-4-hydroxybenzyl)isocyanurate; and phosphorus processing stabilizers, such as tris(2,4-di-t-butylphenyl) phosphite.

The concentration of the oxidation inhibitor in the heating medium composition is preferably 0.01 to 0.5% by weight, more preferably 0.03 to 0.3% by weight. When the oxidation inhibitor concentration is less than 0.01% by weight, oxidation of the synthetic resin is not satisfactorily suppressed, and hence deterioration of the synthetic resin piping is not satisfactorily suppressed. When the oxidation inhibitor concentration exceeds 0.5% by weight, it is not preferred from an economical point of view.

The heating medium composition may contain appropriate combination of a coloring dye, a defoamer, a bittering agent for preventing misdrinking, and a pH adjuster.

The oxidation inhibitor, which is difficult to dissolve in the heating medium composition, may be additionally fed utilizing a feeder 11 shown in FIG. 1 to the heating medium composition being circulated. In this case, the heating medium composition comprises two parts, namely, a liquid agent and a solid agent, and the solid agent is dissolved in the liquid agent in the heat exchange apparatus.

FIG. 1 shows a heat exchange apparatus 12 having a circulation circuit comprising a heat exchanger 13, a radiator 14, a pump 15, and a circulation piping 17. A heating medium composition 16 is charged into the heat exchange apparatus 12.

The pump 15 provided on the downstream side of the heat exchanger 13 forcibly circulates the heating medium composition 16 within the heat exchange apparatus 12. When the heating medium composition 16 passes through an inner piping 17a disposed in the heat exchanger 13, the heating medium composition 16 is heated or cooled by a heat source (not shown) provided in the heat exchanger 13. When the heated or cooled heating medium composition 16 passes through an inner piping 17b disposed in the radiator 14, the heat of the heating medium composition 16 is taken out by the radiator 14 and released to the outside. Thus, the flow of the heating medium composition 16 in the circulation piping 17 transfers heat between the heat exchanger 13 and the radiator 14.

Each of the inner pipings 17a and 17b is in a meander form so as to achieve excellent heat exchange efficiency. The circulation piping 17 is covered with an unillustrated heat insulating material. Therefore, the heat of the heating medium composition 16 is not wastefully released from the circulation piping 17.

The inner piping 17a is made of a metal, and the inner piping 17b is made of a synthetic resin. The circulation piping 17 is made of a metal or a synthetic resin. A connection portion for connecting the circulation piping 17 to the inner pipings 17a and 17b is made of a metal or a synthetic resin.

The circulation piping 17 contains a by-pass passage 21 connected to the downstream side of the pump 15. Two by-pass valves 22 are provided in given positions along the by-pass passage 21, and the feeder 11 is provided between the two by-pass valves 22. Each by-pass valve 22 changes the flow path area of the by-pass passage 21 to adjust the flow rate of the heating medium composition 16 flowing through the by-pass passage 21. When at least one of the by-pass valves 22 is closed, the heating medium composition 16 does not flow through the by-pass passage 21.

A main valve 23 is provided in a given portion along a piping 17c extending in parallel to the by-pass passage 21. The flow rate of the heating medium composition 16 flowing through the piping 17c is adjusted by the main valve 23. When the main valve 23 is closed, the heating medium composition 16 does not flow through the piping 17c.

The feeder 11 has a connection tube 31 connected to the by-pass passage 21, and a cylindrical container 32 protruding from the connection tube 31. Specifically, the connection tube 31 has a guide plate 34 provided in a direction perpendicular to the feeding direction of the heating medium composition 16, and a through hole 33 formed adjacent to the guide plate 34. The through hole 33 allows the connection tube 31 and the cylindrical container 32 to be in communication with one another. The heating medium composition 16 guided by the guide plate 34 flows via the through hole 33 into the cylindrical container 32.

A bag 35 containing therein an oxidation inhibitor in a solid state (preferably in a powder form or a granule form) is disposed in the cylindrical container 32. The bag 35 is formed from a material having such a fine mesh that it permits the heating medium composition 16 to penetrate (pass) therethrough and inhibits leakage of the oxidation inhibitor. A preferred material for the bag 35 is a nonwoven fabric. When the heat exchange apparatus 12 contains a heating circuit, it is preferred that the bag 35 be formed from a heat resistant material. The oxidation inhibitor may be in a tablet form. The oxidation inhibitor in a tablet form is easy for replacement operation. In this case, the bag 35 may be formed using a relatively large mesh.

It is preferred to form in the cylindrical container 32 a window through which the amount of the remaining oxidation inhibitor is confirmed. The cylindrical container 32 has an unillustrated lid which is opened when supplying the oxidation inhibitor. Alternatively, the cylindrical container 32 may be fixed to the connection tube 31 through a waterproof packing and fixture (not shown). The oxidation inhibitor is supplied by opening the lid of the cylindrical container 32 or by removing the cylindrical container 32 from the connection tube 31.

The solubility of the oxidation inhibitor in the heating medium composition 16 is relatively low, but the oxidation inhibitor solubility may vary depending on the temperature. Therefore, for efficiently dissolving the oxidation inhibitor in the heating medium composition 16, it is preferred to adjust the location to which the feeder 11 is connected. For example, when the heat exchange apparatus 12 is a heating circuit, it is preferred that the feeder 11 be disposed immediately downstream the heat exchanger 13. Conversely, when the heat exchange apparatus 12 is a cooling circuit, it is preferred that the feeder 11 be disposed upstream the heat exchanger 13, that is, the downstream side of the radiator 14.

Next, the method for feeding the oxidation inhibitor to the heating medium composition 16 is described. First, the valves 22, 23 are individually adjusted so that the ratio between the flow rate of the heating medium composition 16 flowing through the piping 17c and the flow rate of the heating medium composition 16 flowing through the by-pass passage 21 becomes about 2:8. Thus, about 80% of the sum of the flowing heating medium composition 16 passes through the feeder 11 in the by-pass passage 21.

In the feeder 11, the direction of the flow of the heating medium composition 16 is changed by 90° by the guide plate 34 as indicated by an arrow, and the heating medium composition flows into the cylindrical container 32 and is brought into contact with the oxidation inhibitor contained in the bag 35, so that the oxidation inhibitor is gradually and continuously dissolved in the heating medium composition 16. The oxidation inhibitor dissolved in the heating medium composition 16 continuously exhibits a remarkable effect of oxidation inhibition.

This embodiment has the following advantages.

The heating medium composition comprises a glycol, water, a corrosion inhibitor, and a surfactant. The corrosion inhibitor effectively prevents a metal piping from suffering corrosion, and the surfactant effectively suppresses deterioration of a synthetic resin piping (especially thermoplastic resin tube). Therefore, the heating medium composition generally suppresses deterioration of a heat exchange circuit in a floor heating system, a fan convector, an air conditioner, a road heating system, or a snow melting system, prolonging the life of the heat exchange circuit. A heat exchange circuit having a heating circuit is exposed to high temperature conditions for a long time, and hence the synthetic resin piping in the heat exchange circuit is liable to suffer deterioration. However, by using a heating medium composition containing a surfactant, deterioration of the synthetic resin piping is suppressed to prolong the life of the heat exchange circuit.

The heating medium composition containing a triazole compound as a corrosion inhibitor can readily and extremely effectively suppress deterioration of a metal piping. The heating medium composition containing 0.001 to 0.1% by weight of an anionic surfactant can readily and extremely effectively suppress deterioration of a synthetic resin piping.

The oxidation inhibitor present in the heating medium composition suppresses oxidation of a synthetic resin piping, so that deterioration of the synthetic resin piping due to oxidation is suppressed. The heating medium composition can suppress both deterioration due to oxidation and deterioration due to metal ions simultaneously, and thus the deterioration of the synthetic resin piping is surely well suppressed. When the oxidation inhibitor is a hindered phenol heat stabilizer or a hindered amine heat stabilizer, the deterioration of the synthetic resin piping is further effectively suppressed.

The feeder 11 connected to the by-pass passage 21 has the connection tube 31, and the cylindrical container 32 provided in the center portion of the connection tube 31 as viewed in the longitudinal direction thereof. The heating medium composition 16 continuously passes through the cylindrical container 32 to be in contact with the oxidation inhibitor contained in the cylindrical container 32. Therefore, the oxidation inhibitor having a low solubility is gradually and continuously dissolved in the heating medium composition 16. Accordingly, deterioration of the synthetic resin piping is effectively suppressed.

In other words, in the method for feeding the oxidation inhibitor according to this embodiment, the heating medium composition 16 flowing through the feeder 11 is brought into contact with the oxidation inhibitor in a solid state placed in the feeder 11. Therefore, the oxidation inhibitor is efficiently dissolved in the heating medium composition 16, and only a portion of the oxidation inhibitor dissolved in the heating medium composition 16 is circulated in the circulation piping 17. Neither the oxidation inhibitor in a solid state (in a powder form or a granule form) nor insolubles derived from the oxidation inhibitor circulate in the circulation piping 17, so that occurrences of clogging, circulation failure, and breakage of the circulation piping 17 are prevented.

The oxidation inhibitor is gradually and continuously dissolved in the heating medium composition 16, and therefore, the concentration of the oxidation inhibitor in the heating medium composition 16 is appropriately maintained for a long time.

The amount of the remaining oxidation inhibitor in the feeder 11 can be visually confirmed, and therefore the timing of supplying the oxidation inhibitor can be easily determined. By virtue of confirmation of the remaining oxidation inhibitor, it is possible to extremely easily know as to whether or not the heating medium composition 16 being circulated exhibits a satisfactory effect of oxidation inhibition.

The feeder 11 is provided in the by-pass passage 21 which is provided in parallel to the piping 17c, and therefore, circulation of the heating medium composition 16 in the heat exchange apparatus 12 is substantially not prevented. Accordingly, the heating medium composition 16 to which the oxidation inhibitor is fed is smoothly circulated.

EXAMPLES

Hereinbelow, the present invention will be described with reference to the following Examples and Comparative Examples.

Examples 1 to 7 and Comparative Examples 1 to 7

(1) Ingredients (% by weight) shown in Tables 1 and 2 below were mixed to prepare heating medium compositions in Examples 1 to 7 and Comparative Examples 1 to 7. With respect to each of the heating medium compositions prepared, corrosion loss ($mg/cm^2$) values of metal test specimens (copper, brass, and steel) were individually measured in accordance with the method described in JIS K 2234. Conditions for the test are as follows.

| | |
|---|---|
| Temperature for test: | 88 ± 2° C. |
| Amount of composition used: | 750 ml |
| Period of time for test: | 1000 ± 2 hours |
| Aeration conditions: | 100 ml/min |

(2) The heat stability of a thermoplastic resin tube was examined in accordance with the method described in JIS K 6774 (1998). Two types of thermoplastic resin tubes were used for the test. Resin tube A is crosslinked polyethylene tube 10A (heater tube), manufactured by Mitsubishi Chemical Functional Products, Inc., and resin tube B is crosslinked polyethylene tube 10A (heater tube), manufactured by FURUKAWA ELECTRIC CO., LTD. Resin tubes A and B were individually immersed for 1000±2 hours in each of the heating medium compositions in Examples 1 to 7 and Comparative Examples 1 to 7 which were heated to 88±2° C. With respect to the immersion-treated resin tubes and the untreated resin tubes, an oxidation induction time (OIT) was measured using a differential scanning calorimeter (DSC60, manufactured by Shimadzu Corporation) in accordance with the following procedure.

First, a test specimen having a size of about 3 mm×3 mm square (mass: 5±0.5 mg) was introduced into DSC60. The temperature of the specimen in a nitrogen gas atmosphere in DSC60 was elevated to 210° C. at a temperature elevation rate of 20° C./min. After a lapse of 5 minutes from a point in time when the temperature in DSC60 was stabilized at 210° C., the nitrogen gas atmosphere was changed to an oxygen gas atmosphere so that the specimen was exposed to oxygen. Heat generation caused by oxidation of the specimen was observed, and the change in temperature and the lapse of time were plotted to form an exotherm curve. The measurement was continued until the peak in the exotherm curve ended. An intersecting point of the tangential line to the exotherm curve at a point having the maximum slope and the extension line of the base line was determined. The time at the intersecting point {time lapse (min.) from the starting time of the measurement} corresponds to an OIT.

After measurement of OIT, a percentage of the OIT of the immersion-treated resin tube to the OIT of the untreated resin tube, i.e., an OIT retention (%) was determined.

The higher the OIT retention, the higher the heat stability of the resin tube. In other words, a heating medium composition exhibiting a higher OIT retention has more excellent effect of preventing the resin tube from suffering oxidation (deterioration). The results are shown in Tables 1 and 2.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| ingredients (wt %) | propylene glycol | 30 | 30 | 30 | 30 | 50 | 50 | 50 |
| | water | 69.95 | 69.36 | 69.41 | 69.36 | 49.85 | 49.41 | 49.17 |
| | benzotriazole | 0 | 0 | 0.03 | 0.03 | 0.05 | 0.03 | 0.05 |
| | tolyltriazole | 0.05 | 0.03 | 0 | 0 | 0 | 0 | 0.03 |
| | sodium benzoate | 0 | 0.5 | 0.5 | 0.5 | 0 | 0.5 | 0.5 |
| | sodium 4-(n-dodecyl)benzene sulfonate | 0.005 | 0.01 | 0.01 | 0.01 | 0.005 | 0.01 | 0.005 |
| | tris(2,4-di-t-butylphenyl)phosphate | 0 | 0.1 | 0.05 | 0 | 0.1 | 0 | 0.1 |
| | bis(1-octyloxy-2,2,6,6-tetramethyl-4-pyperidyl) sebacate | 0 | 0 | 0 | 0.1 | 0 | 0.05 | 0.1 |
| | pH | 8.0 | 8.0 | 8.0 | 8.0 | 8.0 | 8.0 | 8.0 |
| corrosion loss ($mg/cm^2$) | copper | −0.03 | −0.03 | −0.02 | −0.05 | −0.03 | −0.05 | −0.04 |
| | brass | −0.05 | −0.04 | −0.05 | −0.04 | −0.04 | −0.05 | −0.05 |
| | steel | −0.08 | −0.05 | −0.04 | −0.06 | −0.08 | −0.06 | −0.03 |
| OIT retention (%) | Resin tube A | 48 | 44 | 46 | 41 | 46 | 36 | 44 |
| | Resin tube B | 42 | 38 | 37 | 35 | 40 | 32 | 40 |

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| ingredients (wt %) | propylene glycol | 30 | 30 | 30 | 30 | 50 | 50 | 50 |
|  | water | 69.95 | 69.47 | 69.45 | 69.89 | 49.75 | 49.35 | 49.20 |
|  | benzotriazole | 0 | 0 | 0.05 | 0 | 0 | 0.05 | 0.05 |
|  | tolyltriazole | 0.05 | 0.03 | 0 | 0 | 0 | 0.05 | 0.05 |
|  | sodium benzoate | 0 | 0.5 | 0.5 | 0 | 0 | 0.5 | 0.5 |
|  | sodium 4-(n-dodecyl)benzene sulfonate | 0 | 0 | 0 | 0.01 | 0.005 | 0 | 0 |
|  | tris(2,4-di-t-butylphenyl) phosphate | 0 | 0 | 0 | 0 | 0.1 | 0 | 0.1 |
|  | bis(1-octyloxy-2,2,6,6-tetramethyl-4-pyperidyl) sebacate | 0 | 0 | 0 | 0.1 | 0 | 0.05 | 0.1 |
|  | pH | 8.0 | 8.0 | 8.0 | 8.0 | 8.0 | 8.0 | 8.0 |
| corrosion loss (mg/cm$^2$) | copper | −0.03 | −0.05 | −0.02 | −0.18 | −0.19 | −0.05 | −0.04 |
|  | brass | −0.05 | −0.04 | −0.05 | −0.15 | 0.17 | −0.05 | −0.05 |
|  | steel | −0.09 | −0.07 | −0.04 | −0.25 | −0.23 | −0.06 | −0.03 |
| OIT retention (%) | Resin tube A | 30 | 32 | 31 | 32 | 33 | 31 | 30 |
|  | Resin tube B | 25 | 27 | 26 | 27 | 24 | 25 | 24 |

From the results shown in Tables 1 and 2, it was found that the degrees of suppression of corrosion of metals (copper, brass, and steel) of the heating medium compositions in Examples 1 to 7 were equivalent to or more excellent than those of the heating medium compositions in Comparative Examples 1 to 7. The OIT retention values of the heating medium compositions in Examples 1 to 7 were considerably higher than those of the heating medium compositions in Comparative Examples 1 to 7. Therefore, it was found that the heating medium compositions in Examples 1 to 7 suppressed oxidation (deterioration) of the resin tube, thus improving the heat stability of the resin tube.

Examples 8 to 12 and Comparative Example 8

Ingredients (% by weight) shown in Table 3 below were mixed to prepare heating medium compositions in Examples 8 to 12 and Comparative Example 8. The heating medium composition in Comparative Example 8 was obtained by diluting a conventional heating medium composition {SHOWBRINE PP super (comprised mainly of propylene glycol), manufactured by SHOWA CO., LTD.} containing neither oxidation inhibitor, corrosion inhibitor, nor surfactant. Each heating medium composition was circulated in heat exchange apparatus 12 of FIG. 1 under the following conditions.

| Temperature: | 60° C. |
|---|---|
| Flow rate: | 1 L/min |
| Period of time: | 336 hours or 1000 hours Continuous operation |

Ratio of the by-pass passage 21 flow rate to the piping 17c flow rate: 8:2

The inner piping 17b in the radiator 14 is comprised of crosslinked polyethylene tube 10A, manufactured by Mitsubishi Chemical Functional Products, Inc., and the other circulation piping 17 is comprised of a copper tube. The bag 35 was formed using polyolefin nonwoven fabric FC-50N, manufactured by Japan Vilene Company, Ltd. The bag 35 was filled with an oxidation inhibitor in a powder form or a granule form, and contained in the feeder 11. In Comparative Example 8, no oxidation inhibitor was used. After completion of the operation of the heat exchange apparatus 12, an OIT retention (%) of the inner piping 17b was measured. The results are shown in Table 3.

TABLE 3

|  |  | Cmp. Ex. 8 | Ex. 8 | Ex. 9 | Ex. 10 | Ex. 11 | Ex. 12 |
|---|---|---|---|---|---|---|---|
| ingredients (wt %) | SHOWBRINE PP super | 30 | — | — | — | — | — |
|  | propylene glycol | — | 30 | 30 | 30 | 30 | 30 |
|  | water | 70 | 69.465 | 69.465 | 69.465 | 69.465 | 69.465 |
|  | tolyltriazole | — | 0.03 | 0.03 | 0.03 | 0.03 | 0.03 |
|  | sodium benzoate | — | 0.5 | 0.5 | 0.5 | 0.5 | 0.5 |
|  | sodium 4-(n-dodecyl)benzene sulfonate | — | 0.005 | 0.005 | 0.005 | 0.005 | 0.005 |
|  | oxidation inhibitor[(1)] | — | 0.1 HA1 | 0.1 HP1 | 0.1 HP2 | 0.1 HA2 | 0.1 Phos |

TABLE 3-continued

|  |  | Cmp. Ex. 8 | Ex. 8 | Ex. 9 | Ex. 10 | Ex. 11 | Ex. 12 |
|---|---|---|---|---|---|---|---|
| OIT retention (%) | immerse 336 hr | 53.2 | 53.2 | 60.0 | 160.8 | 62.2 | 81.8 |
|  | immerse 1000 hr | 41.4 | 48.3 | 55.5 | 38.4 | 134.2 | 78.3 |

[1]Abbreviations indicate the following compounds.
HA1: 1,3,4-trimethyl-2,4,6-tris(3,5-di-t-butyl-4-hydroxybenzyl)benzene
HP1: penta erythrityl-tetrakis[3-(3,5-di-t-butyl-4-hydroxyphenyl)propionate]
HP2: octadecyl-3-(3,5-di-t-butyl-4-hydroxyphenyl)propionate
HA2: tris(3,5-di-t-butyl-4-hydroxybenzyl)isocyanurate
Phos: tris(2,4-di-t-butylphenyl)phosphite The above embodiment may be changed as follows.

The heating medium composition may not contain an antifreeze ingredient. In this case, the effects of the antifreeze ingredient to lower the freezing point and elevate the boiling point of the heating medium composition are not obtained, but deterioration of the metal piping and synthetic resin piping is suppressed.

An alkali metal formate may be used instead of the glycol. Preferred examples of alkali metal formates include sodium formate and potassium formate each having a high solubility in water. Especially, potassium formate is most preferred since the solubility in water is very high. An alkali metal formate may not be used but formic acid and sodium hydroxide or potassium hydroxide may be used. In this case, formic acid is neutralized by sodium hydroxide or potassium hydroxide to form an alkali metal formate in the heating medium composition.

The alkali metal formate exhibits an antifreeze effect similar to that of a glycol. In addition, an aqueous solution of the alkali metal formate does not substantially increase in viscosity even at −20 to −55° C. Further, the alkali metal formate has almost neither corrosion property nor volatility. Therefore, the heating medium composition containing an alkali metal formate is preferred as a circulation heating medium.

The concentration of the alkali metal formate in the heating medium composition is appropriately determined depending on the range of the temperatures at which the heating medium composition is used, but 30 to 60% by weight is preferred. When the alkali metal formate concentration is less than 30% by weight, there is a possibility that the heating medium composition freezes at −15° C. or lower. When the alkali metal formate concentration exceeds 60% by weight, there is a possibility that the heating medium composition does not become in a complete liquid state and a solid is deposited in the composition.

Figure 2:
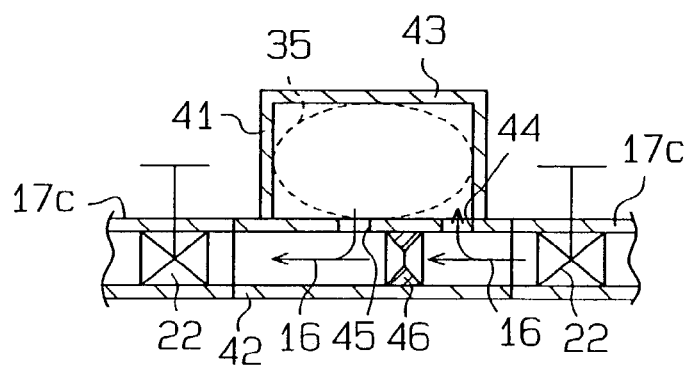
FIG. 2 is a partially cross-sectional view of one form of variation of the heat exchange apparatus of FIG. 1.

Instead of the feeder 11 of FIG. 1, a feeder 41 shown in FIG. 2 may be used. The feeder 41 of FIG. 2 is connected to a given position along the piping 17c in the heat exchange apparatus 12. The feeder 41 has a connection tube 42, and a container box 43 fixed to the outer wall of the connection tube 42. The container box 43 covers an inlet hole 44 and an outlet hole 45 formed in the connection tube 42. The heating medium composition 16 flows to the container box 43 through the inlet hole 44, and flows out of the container box 43 through the outlet hole 45. An oxidation inhibitor is placed in the container box 43. If desired, the bag 35 packed with an oxidation inhibitor may be placed in the container box 43.

It is preferred that the connection tube 42 have a constriction 46 fixed to an intermediate portion between the inlet hole 44 and the outlet hole 45. The constriction 46 reduces the flow path area of the connection tube 42 to restrict the flow rate of the heating medium composition 16. The open area of the constriction 46 is determined so that the ratio between the flow rate of the heating medium composition 16 passing through the constriction 46 and the flow rate of the heating medium composition 16 passing through the container box 43 becomes 2:8.

By operating the heat exchange apparatus 12 having the feeder 41, 80% of the heating medium composition 16 flowing through the piping 17c passes through the container box 43. The heating medium composition 16 is brought into contact with the oxidation inhibitor in the container box 43 to gradually dissolve therein the oxidation inhibitor. The heating medium composition 16 containing the oxidation inhibitor flows through the circulation piping 17.

By virtue of the feeder 41 of FIG. 2, advantages similar to those obtained by the feeder 11 of FIG. 1 can be obtained. Further, the feeder 41 can be fitted to the heat exchange apparatus 12 without a need of forming the by-pass passage 21 in the circulation circuit of heat exchange apparatus 12. Therefore, the feeder 41 can be easily fitted to a general-purpose heat exchange apparatus at low cost.

The invention claimed is:

1. A heating medium composition, comprising:
    a main ingredient selected from the group consisting of water and a mixture of water and an antifreeze ingredient;
    a corrosion inhibitor for preventing a metal material from suffering deterioration;
    a surfactant for preventing a synthetic resin from suffering deterioration, wherein the surfactant is an anionic surfactant in an amount of 0.001 to 0.1% by weight; and
    an oxidation inhibitor for preventing a synthetic resin from being oxidized, wherein the oxidation inhibitor is at least one member selected from the group consisting of pentaerythrityl tetrakis[3-(3,5-di-t-butyl-4-hydroxyphenyl)propionate], octadecyl 3-(3,5-di-t-butyl-4-hydroxyphenyl)propionate, 1,3,5-trimethyl-2,4,6-tris(3,5-di-t-butyl-4-hydroxybenzyl)benzene, tris(3,5-di-t-butyl-4-hydroxybenzyl)isocyanurate, and tris(2,4-di-t-butylphenyl)phosphite.

2. The heating medium composition according to claim 1, wherein the corrosion inhibitor is a triazole compound.

3. The heating medium composition according to claim 1, wherein the antifreeze ingredient is a glycol or an alkali metal formate.

4. The heating medium composition according to claim 2, which contains the triazole compound in an amount of 0.01 to 0.2% by weight.

5. The heating medium composition according to claim 1, which is used in a heat exchange circuit having a metal piping and a synthetic resin piping.

6. The heating medium composition according to claim 1, which is used in a heat exchange circuit having a thermoplastic resin tube.

7. A heating medium composition, comprising:
25 to 60% of propylene glycol;
0.01 to 0.2% of a triazole compound;
0.001 to 0.1% of a surfactant;
an oxidation inhibitor for preventing a synthetic resin from being oxidized; and
water as the balance, wherein the oxidation inhibitor is at least one member selected from the group consisting of pentaerythrityl tetrakis[3-(3,5-di-t-butyl-4-hydroxyphenyl)propionate], octadecyl 3-(3,5-di-t-butyl-4-hydroxyphenyl)propionate, 1,3,5-trimethyl-2,4,6-tris(3,5-di-t-butyl-4-hydroxybenzyl)benzene, tris(3,5-di-t-butyl-4-hydroxybenzyl)isocyanurate, and tris(2,4-di-t-butylphenyl)phosphite.

* * * * *